(12) United States Patent
Klein et al.

(10) Patent No.: US 12,162,247 B2
(45) Date of Patent: Dec. 10, 2024

(54) COMPOSITE PANE COMPRISING A FUNCTIONAL ELEMENT HAVING ELECTRICALLY CONTROLLABLE OPTICAL PROPERTIES AND HAVING A CONCENTRATION GRADIENT OF THE ACTIVE SUBSTANCE

(71) Applicant: SAINT-GOBAIN GLASS FRANCE, Courbevoie (FR)

(72) Inventors: Marcel Klein, Baesweiler (DE); Jefferson Do Rosario, Aachen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 724 days.

(21) Appl. No.: 17/287,456

(22) PCT Filed: Sep. 19, 2019

(86) PCT No.: PCT/EP2019/075201
§ 371 (c)(1),
(2) Date: Apr. 21, 2021

(87) PCT Pub. No.: WO2020/114639
PCT Pub. Date: Jun. 11, 2020

(65) Prior Publication Data
US 2021/0387514 A1    Dec. 16, 2021

(30) Foreign Application Priority Data
Dec. 6, 2018    (EP) .................................... 18210673

(51) Int. Cl.
*B32B 17/10*    (2006.01)
*B60J 1/00*    (2006.01)
(Continued)

(52) U.S. Cl.
CPC .. *B32B 17/10504* (2013.01); *B32B 17/10036* (2013.01); *B32B 17/10348* (2013.01);
(Continued)

(58) Field of Classification Search
CPC ....... B60J 1/001; B60J 3/04; B32B 17/10504; B32B 17/10036; G02F 1/1334
See application file for complete search history.

(56) References Cited

U.S. PATENT DOCUMENTS

| 6,056,861 A | 5/2000 | Fuhr et al. |
|---|---|---|
| 2004/0227462 A1 | 11/2004 | Utsumi et al. |

(Continued)

FOREIGN PATENT DOCUMENTS

| CN | 107614302 A | 1/2018 |
|---|---|---|
| CN | 108227272 A | 6/2018 |

(Continued)

OTHER PUBLICATIONS

International Search Report as issued in International Patent Application No. PCT/EP2019/075201, dated Nov. 27, 2019.

*Primary Examiner* — Dung T Nguyen
*Assistant Examiner* — David Y Chung
(74) *Attorney, Agent, or Firm* — Pillsbury Winthrop Shaw Pittman LLP (57) ABSTRACT

A composite pane includes a functional element having electrically controllable optical properties, includes an inner pane including an inner and outer side and an outer pane including an inner and outer side, a thermoplastic intermediate layer, which joins the inner side) of the inner pane to the inner side of the outer pane, a functional element embedded in the thermoplastic intermediate layer and having electrically controllable optical properties at least including a multilayer film containing, arranged surface-to-surface one above the other in this sequence, a first carrier film, a (Continued)

first surface electrode, an active layer, a second surface electrode, and a second carrier film. The active layer includes a matrix and an active substance, and the concentration of the active substance varies over the area of the functional element.

14 Claims, 3 Drawing Sheets

(51) Int. Cl.
    *B60J 3/04*     (2006.01)
    *G02F 1/1334*     (2006.01)

(52) U.S. Cl.
    CPC ......... *B32B 17/10761* (2013.01); *B60J 1/001* (2013.01); *B60J 3/04* (2013.01); *G02F 1/1334* (2013.01); *B32B 2605/006* (2013.01)

(56) References Cited

U.S. PATENT DOCUMENTS

| | | | |
|---|---|---|---|
| 2005/0146655 A1* | 7/2005 | Barge | B82Y 20/00 349/86 |
| 2011/0171443 A1 | 7/2011 | Thompson | |
| 2012/0026573 A1 | 2/2012 | Collins et al. | |
| 2018/0173039 A1 | 6/2018 | Kim et al. | |
| 2018/0281570 A1* | 10/2018 | Labrot | B32B 17/10192 |
| 2022/0221753 A1* | 7/2022 | Malik | B32B 17/10504 |

FOREIGN PATENT DOCUMENTS

| | | |
|---|---|---|
| DE | 10 2005 007427 A1 | 8/2006 |
| DE | 10 2005 049081 B3 | 6/2007 |
| DE | 10 2007 027296 A1 | 12/2008 |
| DE | 10 2008 026339 A1 | 12/2009 |
| DE | 10 2011 003256 A1 | 8/2012 |
| DE | 10 2013 001334 A1 | 7/2014 |
| EP | 0 876 608 B1 | 11/1998 |
| EP | 0 903 615 A2 | 3/1999 |
| EP | 1 862 849 A1 | 12/2007 |
| EP | 2 010 385 B1 | 1/2009 |
| JP | H04-355424 A | 12/1992 |
| JP | H08-16748 B2 | 2/1996 |
| JP | H09-021999 A | 1/1997 |
| JP | 2012-521575 A | 9/2012 |
| KR | 10-2018-0059531 A | 6/2018 |
| KR | 10-2018-0069428 A | 6/2018 |
| KR | 10-2018-0121123 A | 11/2018 |
| WO | WO 2007/122426 A1 | 11/2007 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2014/086555 A1 | 6/2014 |
| WO | WO 2015/098312 A1 | 7/2015 |
| WO | WO 2017/157626 A1 | 9/2017 |

\* cited by examiner

COMPOSITE PANE COMPRISING A FUNCTIONAL ELEMENT HAVING ELECTRICALLY CONTROLLABLE OPTICAL PROPERTIES AND HAVING A CONCENTRATION GRADIENT OF THE ACTIVE SUBSTANCE

CROSS-REFERENCE TO RELATED APPLICATIONS

This application is the U.S. National Stage of PCT/EP2019/075201, filed Sep. 19, 2019, which in turn claims priority to European patent application number 18210673.2 filed Dec. 6, 2018. The content of these applications are incorporated herein by reference in their entireties.

The invention relates to a composite pane comprising a functional element having electrically controllable optical properties and having a concentration gradient of the active substance within the active layer, as well as a method for producing a composite pane with such a functional element.

In the vehicle sector and in the construction sector, composite panes with electrically controllable functional elements are often used as sun screens or as privacy screens.

Thus, for example, windshields are known in which a sun visor is integrated in the form of a functional element having electrically controllable optical properties. In particular, the transmittance or the scattering behavior of electromagnetic radiation in the visible range is electrically controllable. The functional elements are usually multilayer films, which are laminated into or glued onto a composite pane. These multilayer films generally comprise an active layer between two surface electrodes, with the arrangement usually stabilized by carrier films. The transmittance properties of the active layer can be changed by applying a voltage to the active layer via the surface electrodes. In the case of windshields, the driver can control the transmittance behavior of the pane itself relative to sunlight. Thus, a conventional mechanical sun visor can be dispensed with. As a result, the weight of the vehicle can be reduced and space gained in the roof region. In addition, electrical control of the sun visor is more convenient than the manual folding down of the mechanical sun visor.

Windshields with such electrically controllable sun visors are, for example, known from WO 2014/086555 A1, DE 102013001334 A1, DE 102005049081 B3, DE 102005007427 A1, and DE 102007027296 A1. DE 10 2005 007 427 A1 discloses a motor vehicle with a windshield with transparency controllable in at least one segment, wherein the transparency is automatically controlled as a function of a glare sensor. Moreover, functional elements are also used as roof panels for shading vehicle glazings, as described, for example, in EP 2010385 B1.

Typical electrically controllable functional elements contain, for example, electrochromic layer structures or suspended particle device (SPD) films. Further possible functional elements for realizing an electrically controllable sun screen are so-called PDLC functional elements (polymer dispersed liquid crystal). Their active layer contains liquid crystals that are embedded in a polymer matrix. When no voltage is applied, the liquid crystals are oriented in a disorderly fashion, resulting in strong scattering of the light passing through the active layer. When a voltage is applied on the surface electrodes, the liquid crystals align themselves in a common direction and the transmittance of light through the active layer is increased. The PDLC functional element acts less by reducing total transmittance, but, instead, by increasing scattering to ensure protection against glare.

Laminated-in functional elements and in particular PDLC functional elements often have, in the edge region, undesirable aging phenomena, such as brightening and changes in the shading. The diffusion of compounds, in particular of plasticizers, out of the thermoplastic laminating films of the composite pane into the active layer of the functional element is considered to be the cause. Sealing the edge region of the functional element prevents diffusion and provides a remedy, for example, according to US 20110171443 A1, by applying an adhesive tape that closes the open edge of the active layer. Even when a transparent adhesive tape is selected for this seal, the sealed edge of the functional element is nevertheless discernible as such. Such degradation of the optical quality meets with only very low customer acceptance in the through-vision region of the pane. This is a problem in particular with electrically controllable sun visors whose lower edge is situated within the visible region of the composite pane.

In DE 10 2011 003256 A1, a windshield is equipped with an active glazing as a sun visor, wherein the active glazing tints upon application of a voltage.

WO 2017/157626 A1 describes a windshield with a PDLC functional element as an electrically controllable sun visor.

EP 0903615 A2 discloses a switchable, wavelength-selective filter that comprises a material with a refractive index that is variable in the electric field and which contains dispersed liquid crystal drops.

The object of the present invention is, consequently, to provide an improved composite pane with a functional element that does not have the disadvantages of the prior art, as well as a method for producing the composite pane and use thereof.

The object of the present invention is accomplished by a composite pane comprising a functional element in accordance with the independent claim 1. Preferred embodiments emerge from the dependent claims.

The invention relates to a composite pane comprising a functional element having electrically controllable optical properties, wherein the functional element is embedded in a thermoplastic intermediate layer of the composite pane and the optical properties of the functional element can be controlled as a function of the voltage applied. The functional element comprises at least one multilayer film, which includes, arranged surface-to-surface one above the other in this sequence, a first carrier film, a first surface electrode, an active layer, a second surface electrode, and a second carrier film. The surface electrodes are usually applied in each case on the carrier film adjacent thereto. The active layer of the functional element comprises a matrix and an active substance, wherein, according to the invention, the concentration of the active substance in the matrix varies over the surface of the functional element. According to the invention, "concentration of the active substance" is defined as the mean concentration of the active substance in the section of the matrix under consideration.

Consequently, according to the invention, a composite pane comprising a functional element is provided in which the degree of change in the optical properties can be varied over the surface of the functional element depending on location. The functional elements known in the prior art usually include a constant concentration of the active substance over the surface of the functional element. If, for example, regions with electrically switchable high opacity, lower opacity, and without opacity are desired in a composite pane, according to the prior art, different functional elements or no functional elements must be provided. The transition between these regions with different functional elements or without a functional element is clearly discernible by the viewer in the form of an edge. In contrast, the functional element according to the invention can be introduced as a single functional element over the entire surface of all three regions, wherein the concentration of the active substance is selected depending on the desired opacity. This results in both higher optical quality of product and simplified assembly of the composite pane.

The controllable functional element comprises an active layer between two surface electrodes. The active layer has the controllable optical properties that can be controlled via the voltage applied to the surface electrodes. The surface electrodes and the active layer are typically arranged substantially parallel to one another. The surface electrodes can be electrically connected to an external voltage source in a manner known per se. The electrical contacting can be realized by means of suitable connecting cables, for example, foil conductors that are optionally connected to the surface electrodes via so-called bus bars, for example, strips of an electrically conductive material or electrically conductive imprints.

Preferably, the first carrier film and/or the second carrier film contain at least one polymer that does not fully melt in the autoclave process, preferably polyethylene terephthalate (PET). Particularly preferably, the first and the second carrier film are made of a PET film. The carrier films according to the invention are preferably transparent; but can, however, also be tinted. The thickness of the carrier films is preferably from 0.025 mm to 0.400 mm, in particular from 0.050 mm to 0.200 mm. The surface electrodes are preferably arranged on one surface of the carrier film, i.e., on exactly one of the two sides of the carrier film (i.e., on its front side or its rear side). The carrier films are oriented in the layer stack of the multilayer film such that the surface electrodes are arranged adjacent the active layer. The films can also have different thicknesses and compositions within the ranges mentioned.

Preferably, the carrier films are implemented as a single continuous film in the region of the entire functional element over all concentration regions. As a result, high optical product quality can be achieved. In contrast, in a functional element produced from a plurality of multilayer films placed next to one another at a cut edge, the cut edge remains visible in a pane even after lamination of the functional element in a pane.

In the context of the invention, the term "electrically controllable optical properties" means those properties that are infinitely controllable, but also those that can be switched between two or more discrete states.

The surface electrodes are preferably designed as transparent, electrically conductive layers. The surface electrodes preferably contain at least a metal, a metal alloy, or a transparent conducting oxide (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness of 10 nm to 2 µm, particularly preferably from 20 nm to 1 µm, most particularly preferably from 30 nm to 500 nm.

In a possible embodiment, the surface electrodes can be limited in their surface extension to regions of the functional element in which a switching operation of the functional element is desired. In particular in regions where the concentration of the active substance is zero, it is thus possible to dispense with the first and/or the second surface electrode, preferably with both surface electrodes. This yields an advantageous reduction in production costs. In addition, greater flexibility in the selection of material for the surface electrodes is possible. When, for example, a surface electrode is to be placed within the central field of vision of the windshield, legal minimum requirements for the transparency and optical quality of the pane apply in this region. If the surface electrodes are situated only outside this central field of vision, the requirements are correspondingly lower. Thus, more economical layer systems whose optical quality is slightly degraded can also be used as surface electrodes.

In addition to the active layer and the surface electrodes, the functional element can have other layers known per se, for example, barrier layers, blocking layers, antireflection layers, protective layers, and/or smoothing layers.

Preferably, the active layer of the functional element contains multiple concentration regions that differ in the concentration of the active substance. Here, as well, the mean concentration of the active substance within the region under consideration is used. Within a concentration region, the concentration of the active substance in the matrix can be constant, with the local concentration at individual points within the region corresponding to the mean concentration of the region. In another embodiment, the concentration within a concentration region can also be variable, wherein the local concentration can deviate from the mean concentration and the mean concentration can be considered to be the arithmetic mean of the local concentration. A concentration region of constant concentration is simpler to design in terms of its production than a concentration region with a variable profile. However, a variable profile can have a particularly appealing visual effect.

Preferably, the active layer comprises at least one first concentration region with an initial concentration $c_0$ of the active substance and a second concentration region, in which the concentration of the active substance is zero. In this embodiment, the region with a concentration $c_0$ is a region in which an electrically controllable change in optical properties is desired. With lamination of the functional element into a windshield, this region can be used, for example, as an electrically switchable sun visor. In the second concentration region, no electrically controllable change in the optical properties occurs. This region of the functional element extends, for example, in the through-vision region of the windshield. Such a functional element can thus be introduced over a large area in a composite pane, with the active substance introduced only in regions of the matrix in which an electrically controllable change in the optical properties is desired. This is particularly advantageous since, in this manner, no visually distracting edge between the regions is visible. Furthermore, additional film elements, with which, according to the prior art, the differences in thickness would have to be compensated in a through-vision region without a functional element, can be dispensed with.

A third concentration region can be provided between the first concentration region and the second concentration region. The third concentration region is adjacent the first concentration region on one side and adjacent the second concentration region on another side. In the third concentration region, the concentration of the active substance in the matrix is in this case between the concentration in the first concentration region and the concentration in the second concentration region. In this manner, a visually appealing transition between the first concentration region of higher concentration and a second concentration region of lower concentration is created.

In a preferred embodiment, a second concentration region with a concentration of the active substance of c=0 can also be dispensed with. Here, there is active substance in the entire region of the functional element, with the concentration varying over the functional element. Such an embodiment is very well suited for applications in roof panels, in which no field of vision with high light transmittance is required, but, for example, a sun visor is desired in the entire region of the panel.

In another preferred embodiment, the first concentration region has an concentration $c_0$ substantially constant over the first concentration region, whereas in the second concentration region, the concentration of the active substance is zero. In the third concentration region, positioned between these regions, there can be either a constant concentration with $c<c_0$, or a concentration profile can be used. A concentration profile has a particularly appealing visual effect. The local concentration at the side edge of the third concentration region adjacent the first concentration region corresponds to the initial concentration $c_0$ in the first concentration region. Over the third concentration region, the concentration decreases in its further profile, until it reaches a value of c=0 at the side edge adjacent the second concentration region. The third concentration region thus creates a visually appealing smooth transition between the first and the second concentration region.

The initial concentration $c_0$ of the active substance in the first concentration region is optimized with regard to optimum switchability and the desired change in the optical properties. For this, the initial concentration can be selected in accordance with the concentrations of the active substance customary with functional elements known in the prior art. In the third concentration region, the concentration of the active substance is preferably between 20% of the initial concentration and 70% of the initial concentration, particularly preferably 40% to 60% of the initial concentration. This makes it possible to achieve a visually appealing transition between the first concentration region with the initial concentration and the second concentration region with c=0.

Any number of further concentration regions whose mean concentration is between the concentrations of the adjacent concentration regions can be arranged between the first concentration region and the third concentration region, and between the third concentration region and the second concentration region. Thus, an improved visually smooth transition between the regions can be created.

In an advantageous embodiment, the functional element is a PDLC functional element (polymer dispersed liquid crystal). The active layer of a PDLC functional element contains liquid crystals that are embedded in a polymer matrix. When no voltage is applied to the surface electrodes, the liquid crystals are aligned in a disorderly manner, resulting in strong scattering of the light passing through the active layer. When a voltage is applied to the surface electrodes, the liquid crystals align themselves in a common direction and the transmittance of light through the active layer is increased. Such a functional element is known, for example, from DE 102008026339 A1. Accordingly, liquid crystals, which are dispersed in the form of liquid crystal droplets in a matrix, in this case a polymeric matrix, are the active substance of the PDLC functional element. Together, the polymeric matrix and the liquid crystal droplets dispersed therein form the active layer.

In other possible embodiments, the active layer is an SPD, an electrochromic, or an electroluminescent layer.

An SPD (suspended particle device) functional element contains an active layer comprising suspended particles, with the absorption of light by the active layer being variable by application of a voltage to the surface electrodes. The change in absorption is based on the alignment of the rod-shaped particles in the electric field when electric voltage is applied. SPD functional elements are known, for example, from EP 0876608 B1 and WO 2011033313 A1.

In an electrochromic functional element, the active layer of the functional element is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, which causes a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In electroluminescent functional elements, the active layer contains electroluminescent materials, in particular organic electroluminescent materials whose luminescence is stimulated by the application of a voltage. Electroluminescent functional elements are known, for example, from US 2004227462 A1 and WO 2010112789 A2. The electroluminescent functional element can be used as a simple light source or as a display with which any presentations can be shown.

In a preferred embodiment of the invention, the functional element is a PDLC functional element, wherein the concentration of the active substance is varied by the number of liquid crystal droplets. This is advantageous since, in this manner, during production of the various concentration regions, only an additional amount of matrix substance has to be added in order to set the desired concentration of the active substance. In an alternative embodiment, the concentration of the active substance can be adjusted by varying the size of the liquid crystal droplets.

In the composite pane according to the invention, the functional element is embedded in the intermediate layer of the composite pane. The intermediate layer joins the first pane and the second pane of the composite pane. As already described, the controllable functional element comprises the active layer, which has controllable optical properties. For this purpose, the active layer contains an active substance whose optical properties are variable depending on the voltage applied to the functional element. The active substance is incorporated in a matrix, with the concentration of the active substance varying within the matrix over the surface of the functional element.

This has the advantage that the concentration of the active substance can be selected depending on the location for the desired degree of change in the optical properties of the functional element. In the case of a functional element that is switchable between a transparent and a non-transparent state, the concentration in regions that are to have increased transparency in any switching state is, for example, selected lower than in regions that are to be as opaque as possible in the non-transparent state. The invention thus enables location-dependent modifiable opacity by means of a single continuous functional element in the composite pane. According to the prior art, functional elements are used only in the regions of a composite pane in which such electrical control of the optical properties is desired. In a non-transparently switched state of such a functional element, the transition between regions including a functional element and a thermoplastic intermediate layer adjacent thereto appears as a distracting edge. Even in the transparently switched state of the functional element, this edge is clearly perceptible. Moreover, an edge seal of the functional element, likewise clearly discernible, is necessary. The invention provides a remedy here since a functional element can be inserted areally over large part of the pane and, thus, no visual degradations at all appear in the through-vision region of the pane. In addition, even transition regions between a region that can be switched as non-transparent as possible and a region that is transparent regardless of the switching state can be designed to be visually appealing. In such a transition region, there can, for example, be a third concentration region of the functional element, in which the concentration of the active substance decreases from the non-transparent switchable region to the transparent region.

The surface electrodes and the active layer of the functional element are typically arranged substantially parallel to the inner pane and the outer pane of the composite pane. The surface electrodes are electrically connected to an external voltage source in a manner known per se. The electrical contacting is realized by means of suitable connecting cables, for example, foil conductors that are preferably connected to the surface electrodes via bus bars.

Preferably, a functional element with a variable concentration of the active substance is inserted into the composite pane according to invention such that the concentration of the active substance decreases from one pane edge of the composite pane to an opposite pane edge of the composite pane. This is, for example, advantageous when glare protection is to be created in a certain area of the pane whereas a different region of the pane has high transparency. The corresponding concentration gradient between the opposite pane edges can run continuously or discontinuously. Thus, for example, a plurality of concentration regions with decreasing concentration can follow one another, with a constant concentration being present within each of these concentration regions. In another embodiment, one or a plurality of these concentration regions can themselves have a variable concentration profile decreasing in one direction.

The composite pane can, for example, be the windshield or the roof panel of a vehicle or another vehicle glazing, for example, a glass partition in a vehicle, preferably in a rail vehicle or a bus. Alternatively, the composite pane can be an architectural glazing, for example, in an outer façade of a building or a glass partition in the interior of a building.

The terms "outer pane" and "inner pane" arbitrarily describe two different panes. In particular, the outer pane can be referred to as a "first pane" and the inner pane as a "second pane".

In the context of the invention, when the composite pane is intended, in a window opening of a vehicle or of a building, to separate an interior space from the external environment, the pane (second pane) facing the interior (vehicle interior) is referred to as the "inner pane". The pane (first pane) facing the external environment is referred to as the "outer pane". However, the invention is not limited to this.

The composite pane according to the invention contains a functional element having electrically controllable optical properties, which is arranged between a first thermoplastic laminating film and a second thermoplastic laminating film, at least in sections. The first and second thermoplastic laminating films usually have the same dimensions as the first and the second pane.

In an advantageous embodiment, the composite pane according to the invention is a windshield of a motor vehicle. This comprises an engine edge, which is adjacent the engine hood in the installed position of the composite pane in the vehicle body, and a roof edge, which is adjacent the vehicle roof in the installed position. The engine edge and the roof edge form two opposite pane edges. Two side edges opposite one another, which are adjacent the so-called A-pillars of the body in the installed position of the windshield, extend between the engine edge and the roof edge. According to this embodiment, the first concentration region with an initial concentration $c_0$ of the active substance is arranged adjacent the roof edge, whereas a second concentration region, in which the concentration of the active substance is zero, is arranged adjacent the engine edge. Such an embodiment is particularly advantageous as a windshield including a functional element as an electrically controllable sun visor. The first concentration region serves as a switchable sun visor, wherein the initial concentration $c_0$ is selected such that good shading is insured. The second concentration region corresponds to the through-vision region of the windshield, with no active substance present in this region and, consequently, there is optimum transparency regardless of the switching state. Optionally, between the first and the second concentration region is situated a third concentration region, which, as already described, effects a visually appealing transition between the two concentration regions.

Windshields have a central field of vision, the optical quality of which is subject to high requirements. The central field of vision must have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision B is defined in Annex 18.

The windshield according to the invention contains a functional element with electrically controllable optical properties, wherein the first concentration region with an initial concentration $c_0$ of the active substance is arranged above the central field of vision (field of vision B). This means that the region of the functional element in which the maximum change in optical properties occurs is arranged in the region between the central field of vision and the upper edge of the windshield. The first concentration region does not have to cover this entire pane region but is, however, positioned completely within this region and does not protrude into the central field of vision. In other words, the first concentration region of the functional element is less distant from the upper edge of the windshield than the central field of vision. Thus, the transmittance of the central field of vision is not adversely affected by the first concentration region of the functional element, which is positioned in a location similar to that of a conventional mechanical sun visor in the folded-down state. In the field of vision of the windshield, a second concentration region of the functional element is arranged, in which the concentration of the active substance is zero. Therefore, in the central field of vision of the windshield, the transmittance is affected by the functional element either not all or only insignificantly. In the non-transparent switched state of the functional element, there is no change in the optical properties in the region of the field of vision with the second concentration region. Optionally, in this embodiment as well, a third concentration region can be situated between the first and the second concentration region. This can either be situated completely above the central field of vision or even protrude into it in sections.

In one embodiment of the invention, the functional element of the composite pane according to the invention is divided into segments by separating lines, also referred to as isolation lines. The separating lines are in particular introduced into the surface electrodes such that the segments of the surface electrode are electrically isolated from one another. At least one of the surface electrodes has at least one separating line, which divides the surface electrode into at least two segments, whose electrically controllable optical properties can be switched independently of one another. For this purpose, the individual segments are connected to the voltage source independently of one another such that they can be actuated separately. Thus, for example, different regions of the sun visor can be switched independently. Particularly preferably, in a windshield with a sun visor, the separating lines and the segments are arranged horizontally in the installation position. Thus, the height of the sun visor can be controlled by the user. The term "horizontal" is to be interpreted broadly here and refers to a direction of extension that runs between the side edges of the windshield. The separating lines do not necessarily have to be straight, but can also be slightly curved, preferably adapted to possible curvature of the upper edge of the windshield, in particular substantially parallel to the upper edge of the windshield. Vertical separating lines are, of course, also conceivable.

The segments can, in principle, be placed completely independently of the arrangement of the concentration regions. In one possible embodiment, a plurality of segments are situated in the region of the first concentration region with an initial concentration $c_0$ of the active substance, as a result of which, for example, the electrically controllable sun visor of a windshield can be variably adjusted depending on the position of the sun. In this case, the first concentration region represents the region of the sun visor, in which complete glare protection is to be achieved. In the case of the second concentration region without active substance, it suffices, in principle, to provide a single segment since, in this region, no change in the optical properties is desired and does not occur even when a voltage is applied. Also, for this reason, no bus bars have to be provided in the second concentration region. The second concentration region can even be combined, together with a section of the first or optional third concentration region, to form a segment, with the bus bars optionally possibly extending even into the region of the second concentration region.

The separating lines have, for example, a width of 5 μm to 500 μm, in particular 20 μm to 200 μm. The width of the segments, i.e., the distance between adjacent separating lines can be suitably selected by the person skilled in the art according to the requirements of the individual case.

The separating lines can be introduced by laser ablation, mechanical cutting, or etching during production of the functional element. Already laminated multilayer films can also be subsequently segmented by laser ablation.

The functional element is integrated between the inner pane and the outer pane of the composite pane via a thermoplastic intermediate layer. The intermediate layer preferably comprises a first thermoplastic laminating film, which bonds the functional element to the inner pane, and a second thermoplastic laminating film, which bonds the functional element to the outer pane. Typically, the thermoplastic intermediate layer is formed by at least the first and the second thermoplastic laminating film, which are arranged flat one over another and are laminated to one another, with the functional element inserted between the two layers. The regions of the laminating films overlapping the functional element then form the regions that bond the functional element to the panes. In other regions of the pane where the thermoplastic laminating films make direct contact with one another, they can fuse during lamination such that the two original layers are no longer discernible and, instead, there is a homogeneous intermediate layer.

A thermoplastic laminating film can, for example, be formed by a single thermoplastic film. A thermoplastic laminating film can also be formed from sections of different thermoplastic films whose side edges are adjacent one another. In addition to a first thermoplastic laminating film or a second thermoplastic laminating film, other thermoplastic laminating films can also be present. These can, if need be, also be used for embedding additional films comprising functional layers, for example, infrared-reflecting layers or acoustically damping layers.

In a possible embodiment of the invention, the functional element, more precisely the side edges of the functional element, is circumferentially surrounded by a thermoplastic frame film. The thermoplastic frame film has roughly the same thickness as the functional element. According to the prior art, local differences in thickness of the composite pane, which are introduced by locally limited functional elements, are compensated by such a frame film such that glass breakage during lamination can be avoided. The functional element according to the invention, which can be used over a large area and even in transparent regions of the composite pane, yields an advantageous reduction in the pane regions with a thermoplastic frame film. In a preferred embodiment, a thermoplastic frame film is completely dispensed with, with the functional element occupying a large part of the pane area and the proportional area of the regions of lower thickness without a functional element is so low that compensation is unnecessary. Preferably, the functional element occupies at least 95% of the area of the composite pane. Particularly preferably, the functional element completely occupies the entire through-vision region of a windshield with such a functional element. An optically distracting circumferential edge of the functional element in the field of vision is concealed by the opaque masking print customarily present in the edge region of the windshield.

In another possible embodiment of the invention, a frame film is used. This can, for example, be useful in the case of functional elements of particularly high thickness. The frame film is implemented like a frame with a recess into which the functional element is inserted. The thermoplastic frame film can be formed by a thermoplastic film in which the recess had been cut out. Alternatively, the thermoplastic frame film can also be composed of a plurality of film sections around the functional element. Thus, the intermediate layer is formed, in a preferred embodiment, from a total of at least three thermoplastic laminating films arranged flat one atop another, wherein the frame film, as the middle layer, has a recess in which the functional element is arranged. During production, the thermoplastic frame film is arranged between the first and the second thermoplastic laminating film, with the side edges of all thermoplastic films preferably situated congruently. The thermoplastic frame film preferably has roughly the same thickness as the functional element. This compensates for the local difference in thickness of the composite pane that is introduced by the locally limited functional element such that glass breakage during lamination can be avoided.

Even when a thermoplastic frame film is used, the composite pane according to the invention still has substantially higher optical quality than the composite panes with a functional element known in the prior art. According to the prior art, the lower edge of a locally inserted functional element as a sun visor of a windshield is typically visible as a visually clearly discernible edge, since, in the field of vision of the windshield, no functional element is present, but the thermoplastic frame film is. According to the invention, the functional element extends into the through-vision region of the pane such that a visually appealing appearance is achieved without a distracting edge. The frame film is used, if need be, in the edge region of the pane that is concealed by an opaque masking print.

Optionally, the circumferential edge of the functional element is provided, completely or partially, with a seal. This can, for example, be placed in the form of an adhesive tape around the open edge of the functional element or also be implemented in the form of barrier films that are placed on the functional element in the edge region above and below the functional element and enclose the edge. The barrier films include a plasticizer-free material, for example, plasticizer-free PVB or PET. The seal prevents diffusion of plasticizers from the thermoplastic laminating films into the active layer of the functional element. A seal can be dispensed with on edge sections of the functional element where the concentration of the active substance is zero. This is an advantage of the invention.

Preferably, at least the region of the first and/or the second thermoplastic laminating film in which the first concentration region of the functional element is located is tinted or colored. The transmittance of this region in the visible spectral range is thus reduced compared to a non-tinted or non-colored layer. The tinted/colored region of the thermoplastic laminating films thus reduces the transmittance of the windshield in the region of the sun visor. In particular, the aesthetic impression of the functional element is improved because the tinting results in a more neutral appearance that has a more pleasant effect on the viewer. The tinting preferably extends in the region of the first concentration region and, if present, of the third concentration region, with the tinting also possibly protruding into a partial region of the second concentration region without active substance.

The tinted or colored region of the thermoplastic intermediate layer preferably has transmittance in the visible spectral range of 10% to 50%, particularly preferably of 20% to 40%. Particularly good results in terms of glare protection and visual appearance are thus achieved.

The tinted or colored region can be colored or tinted homogeneously, in other words, can have location-independent transmittance. The tinting or coloring can, however, also be inhomogeneous; in particular, a transmittance profile can be realized. In one embodiment, the transmittance level in the tinted or colored region decreases, at least in sections, with increasing distance from the upper edge. Thus, sharp edges of the tinted or colored area can be avoided such that the transition from a PDLC functional element used as a sun visor into the transparent region of the windshield is gradual, which appears more appealing aesthetically.

In an advantageous embodiment, the first pane is the outer pane and the region of the first thermoplastic laminating film, i.e., the region between the functional element and the outer pane is tinted in sections in the region of the first and optional third concentration region. This creates a particularly aesthetic impression when the outer pane is viewed from above. Optionally, the region of the second thermoplastic laminating film between the functional element and the inner pane (second pane) can additionally be colored or tinted.

The thermoplastic intermediate layer comprising the first and the second thermoplastic laminating film and any other polymeric films are not colored or tinted, but are clear and transparent in the central field of vision of a windshield. This ensures that the through-vision through the central field of vision is unrestricted such that the pane can be used as a windshield. The term "a transparent thermoplastic laminating film" refers to a layer with light transmittance in the visible spectral range of at least 70%, preferably at least 80%. The transparent intermediate layer is present at least in the field of vision A, preferably also in the field of vision B per ECE-R43.

If the composite pane according to the invention is a windshield with a sun visor, the upper edge and the side edges of the functional element are preferably concealed in through-vision through the pane by an opaque masking print. Windshields typically have a circumferential peripheral masking print made of an opaque enamel, which serves in particular to protect the adhesive used for installation of the pane against UV radiation and to visually conceal it. This peripheral masking print is preferably used to also conceal the upper edge and the side edge of the functional element as well as the necessary electrical connections. The sun visor is then advantageously integrated into the appearance of the windshield, and only the lower edge is potentially discernible to the viewer. Preferably, both the outer pane and also the inner pane have a masking print such that through-vision is prevented from both sides.

The functional element can also have recesses or holes, for instance, in the region of so-called sensor windows or camera windows. These regions are provided to be equipped with sensors or cameras whose function would be impaired by a controllable functional element in the beam path, for example, rain sensors The functional element (or the totality of the functional elements in the above-described case of a plurality of functional elements) is preferably arranged over the entire width of the windshield, minus an edge region having a width of, for example, 2 mm to 20 mm. Preferably, the functional element also has a distance of, for example, 2 mm to 20 mm from the upper edge. The functional element is thus encapsulated within the intermediate layer and protected against contact with the surrounding atmosphere and corrosion.

The electrical control of the functional element is done, for example, using switches, rotary knobs, or sliders that are integrated into the dashboard of the vehicle. However, a switch area, for example, a capacitive switch area, for control can also be integrated into the windshield and/or into the roof surface. Alternatively, or additionally, the functional element can be controlled by contactless methods, for example, by gesture recognition, or as a function of the pupil or eyelid state detected by a camera and suitable evaluation electronics. Control as a function of the eyelid or pupil state is is considered especially in the case of functional elements as a sun visor of a windshield. Alternatively, or additionally, the functional element can be controlled by sensors that detect light incidence on the pane.

The first thermoplastic laminating film and the second thermoplastic laminating film and, optionally, other thermoplastic laminating films as well, preferably contain at least polyvinyl butyral (PVB), ethylene vinyl acetate (EVA), and/or polyurethane (PU), particularly preferably PVB.

The thickness of each thermoplastic laminating film is preferably from 0.2 mm to 2 mm, particularly preferably from 0.3 mm to 1 mm, in particular from 0.3 mm to 0.5 mm, for example, 0.38 mm.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The outer pane and/or the inner pane can be thermally or chemically tempered. In particular, thin panes with a thickness less than or equal to 1 mm are preferably made of chemically tempered aluminosilicate glass. The panes can be clear, or also tinted or colored provided the windshield has adequate light transmittance in the central field of vision, preferably at least 70% in the primary through-vision zone A per ECE-R43.

The outer pane, the inner pane, and/or the intermediate layer can have further suitable coatings known per se, for example, antireflection coatings, nonstick coatings, antiscratch coatings, photocatalytic coatings, or solar protection coatings, or low-E coatings.

The thickness of the outer pane and of the inner pane can vary widely and thus be adapted to the requirements of the individual case. The outer pane and the inner pane preferably have thicknesses of 0.5 mm to 5 mm, particularly preferably of 1 mm to 3 mm.

The invention further relates to a method for producing a composite pane comprising a functional element, comprising the steps a) providing a functional element having electrically controllable optical properties, whose active layer comprises a matrix and an active substance, wherein the concentration of the active substance varies over the surface of the functional element, b) placing a layer stack on an inner pane or an outer pane, wherein the layer stack comprises, in this sequence, at least one first thermoplastic laminating film, the functional element provided in step a), and a second thermoplastic laminating film; and the layer stack is completed with an inner pane or an outer pane, c) joining the inner pane and the outer pane by lamination, wherein a thermoplastic intermediate layer with an embedded functional element is formed from the first thermoplastic laminating film and the second thermoplastic laminating film.

The electrical contacting of the surface electrodes of the functional element is preferably done prior to lamination of the composite pane.

Any imprints, for example, opaque masking prints or printed bus bars for the electrical contacting of the functional element are preferably applied by screen printing.

The lamination is preferably done under the action of heat, vacuum, and/or pressure. Lamination methods known per se can be used, for example, autoclave methods, vacuum bag methods, vacuum ring methods, calendar methods, vacuum laminators, or combinations thereof.

In a preferred embodiment of the method according to the invention, before step a), a functional element is produced in the form of a multilayer film comprising the steps mentioned below:

a1) providing a first carrier film with a first surface electrode, wherein the surface electrode is applied in the form of an electrically conductive layer on a surface of the carrier film, a2) applying a solution comprising a matrix substance for forming a matrix and an active substance on at least one section of the first surface electrode of the first carrier film, wherein the ratio of active substance to matrix substance is selected such that, in at least one section of the first surface electrode, a first concentration region with an initial concentration $c_0$ of the active substance is created, a3) applying a solution comprising a matrix substance for forming a matrix and an active substance on at least one other section of the first surface electrode of the first carrier film, wherein the ratio of active substance to matrix substance is selected such that, in at least one section of the first surface electrode, a second concentration region with a concentration $c<c_0$ of the active substance is created, a4) covering the arrangement with a second carrier film with a second surface electrode, wherein the second surface electrode is applied in the form of an electrically conductive layer on a surface of the carrier film and is oriented in the direction of the active substance, a5) joining the layer stack to form a multilayer film as a functional element, wherein an active layer is formed from the matrix and the active substance.

Known in the prior art are various methods for producing multilayer films as functional elements, with which the functional elements known in the prior art that have a constant concentration of the active substance over the entire functional element can be provided. In a preferred embodiment of the method according to the invention, a PDLC functional element is produced. Generally, for the production of PDLC multilayer films as functional elements, a distinction is made between the methods for so-called "encapsulation" and the phase separation methods. In encapsulation, liquid crystals are first dispersed in a polymer solution using a solvent in which the liquid crystals are not soluble. When the solvent is evaporated, the active layer is formed by solidification of the polymer matrix. The size of the liquid crystal droplets dispersed in the polymer solution depends on how intensely the solution is stirred. During the course of the process, a partial, undesired coagulation of the liquid crystal droplets can occur, making the morphology of the active layer difficult to control. In the phase separation methods known in the prior art, there is initially a homogeneous system with the liquid crystal droplets forming during solidification of the matrix. The various phase separation methods differ fundamentally by the method of curing of the matrix. These include phase separation by thermal curing of the polymers, by evaporation of the solvent, by temperature-induced phase separation during cooling, or by photopolymerization using UV light. Phase separation methods are more common and easier to implement than encapsulation. In principle, various types of phase separation methods are suitable for implementing the invention.

In one possible embodiment of the method according to the invention, a PDLC functional element is produced by photopolymerization. Solutions containing liquid crystals and prepolymers with different liquid crystal concentrations are applied in the various desired concentration regions of the functional element. The prepolymer is cured by UV light, whereby the liquid crystals are enclosed in the form of droplets in the polymer matrix that forms.

If, during production of the functional element using one of the aforementioned methods, liquid crystal-(pre-)polymer solutions are applied in regions immediately adjacent one another, which is usually the case, diffusion of the active substance occurs between these regions with solutions of different concentration. This has the effect that the transitions between the concentration regions do not appear visually as sharp edges, but are attenuated. Depending on the extent to which this is desired, a longer waiting period before the curing of the active layer can be selectively provided.

In a preferred embodiment of the method according to the invention, a third concentration region is generated in situ between a first concentration region with an initial concentration $c_0$ of the active substance and a second concentration region with an active substance concentration of $c=0$. A first liquid crystal-(pre-)polymer solution is applied to the surface on which a first concentration region is to be generated, and a (pre-)polymer solution without liquid crystals is applied to the surface on which a second concentration region is to be generated. In the region where the two solutions makes direct contact, they mix by diffusion. This generates a third concentration region in which the concentration of the active substance is between zero and $c_0$. The mixing of the solutions can optionally also be improved by mechanical methods, for example, by shaking the carrier film with solutions thereon.

The invention further includes the use of a composite pane according to the invention as a windshield or roof panel of a vehicle, preferably as a windshield of a vehicle, wherein the electrically controllable functional element is used as a sun visor.

The invention is explained in detail with reference to drawings and exemplary embodiments. The drawings are schematic representations and not to scale. The drawings in no way restrict the invention. They depict.

Figure 1A:
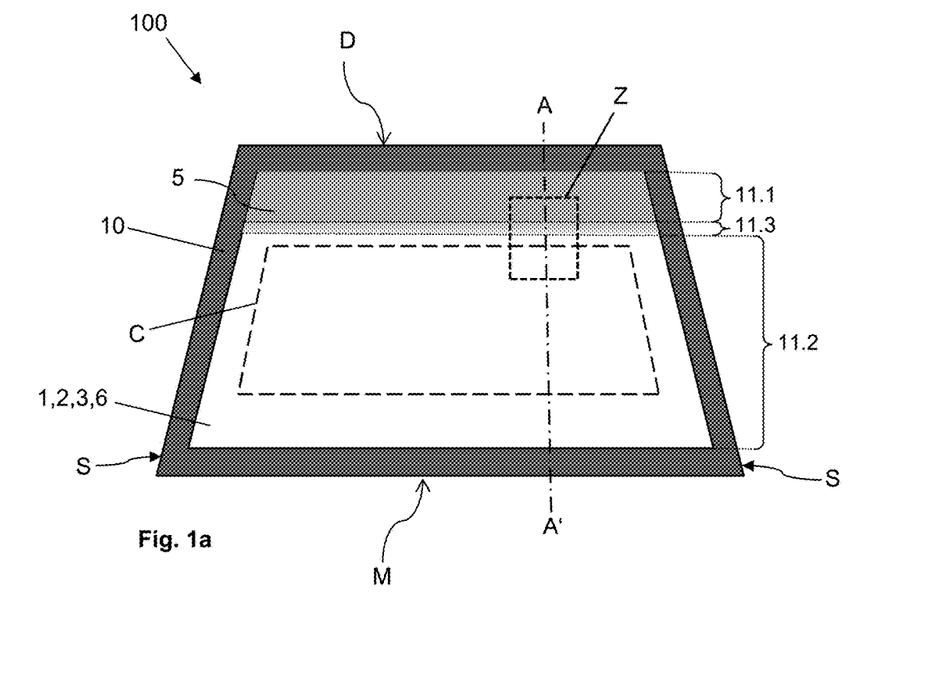
FIG. 1a an embodiment of a composite pane according to the invention as a windshield with a sun visor, FIG. 1b a cross-section along the section line AA' through the composite pane of FIG. 1a in the region Z, FIG. 1c a diagram of the concentration profile of the active substance along the section line AA' of the composite pane of FIG. 1a, FIG. 2 another embodiment of a composite pane according to the invention as a windshield with a sun visor, FIG. 3a an embodiment of a composite pane according to the invention as a roof panel with a sun visor, FIG. 3b a cross-section through the composite pane of FIG. 3a along the section line BB'.
Figure 1B:
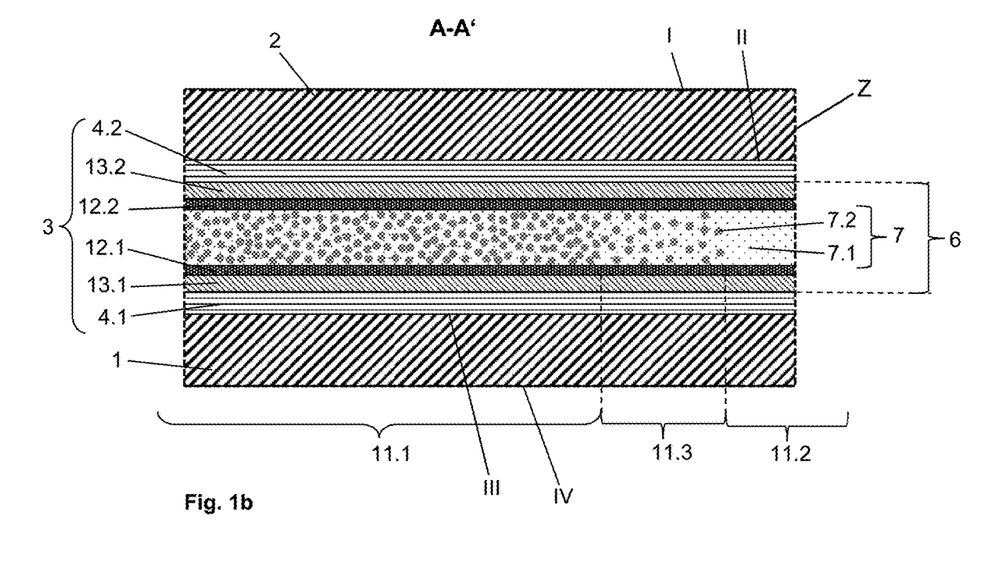

FIGS. 1a and 1b depict an embodiment of a composite pane 100 according to the invention comprising an inner pane 1, an outer pane 2, and a thermoplastic intermediate layer 3, in which a multilayer film 6 is embedded as a functional element 5. FIG. 1a depicts a plan view of the composite pane 100 according to the invention. The composite pane 100 is implemented trapezoidal in the form of a windshield. The outer pane 2 has a thickness of 2.1 mm and is made of a green tinted soda lime glass. The inner pane 1 has a thickness of 1.6 mm and is made of a clear soda lime glass. The windshield has an upper edge D facing the roof in the installed position and a lower edge M facing the engine compartment in the installed position. The central field of vision C of the windshield is indicated in the form of a non-continuous line. The functional element 5 is introduced over a large area in the entire through-vision region of the pane, i.e., in the entire region of the windshield that is not concealed by an opaque masking print 10.

The edge region of the composite pane 100 is concealed by a circumferential opaque masking print 10 (circumferential peripheral black print), which is applied at least on the inner side II of the outer pane 2. The black print is formed by printing an opaque enamel on the interior-side surfaces (facing the interior of the vehicle in the installed position) of the panes. A black print 10 can, optionally, also be applied on the inner side III of the inner panel. The circumferential edge (not shown here) of the functional element 5 is in the region of the opaque masking print 10 such that it cannot be discerned when viewing the windshield from the outside. The distance of the functional element 5 from the circumferential edge of the windshield is thus less than the width of the opaque masking print 10. The electrical connections (not shown) are also reasonably applied in the region of the masking print 10 and thus hidden. Bus bars (not shown) are attached on the first surface electrode 13.1 and the second surface electrode 13.2 of the multilayer film 6 in the region of the opaque masking print 10. An electrical voltage can be applied between the surface electrodes 13.1, 13.2 via the bus bars. The bus bars preferably run along the side edges S of the functional element 5.

FIG. 1b depicts a cross-section of the composite pane 100 of FIG. 1a along the section line AA' in the region Z. The functional element 5 is formed by a PDLC multilayer film 6. The multilayer film 6 is bonded to the inner pane 1 by a first thermoplastic laminating film 4.1 and to the outer pane 2 via a second thermoplastic laminating film 4.2. The functional element 5 can be controlled in its optical properties by applying an electrical voltage. For the sake of simplicity, the electrical supply lines are not shown.

The controllable functional element 5 is a multilayer film 6, for example, a PDLC multilayer film, consisting of an active layer 7 between two surface electrodes 12.1, 12.2 and two carrier films 13.1, 13.2. The active layer 7 contains a matrix 7.1 with an active substance 7.2 situated therein. In the case of a PDLC multilayer film, the matrix 7.1 is formed by a polymeric matrix, in which dispersed liquid crystals are contained as the active substance 7.2. The liquid crystals are present in drop form with a drop size of a few μm. The liquid crystals align themselves as a function of the electrical voltage applied on the surface electrodes 12.1, 12.2, as a result of which the optical properties can be controlled. The carrier films 13.1, 13.2 are made of PET and have a thickness of, for example, 50 μm. The carrier films 13.1, 13.2 are provided with a coating of ITO facing the active layer 7 and having a thickness of approx. 100 nm, which form the surface electrodes 12.1, 12.2. The surface electrodes 12.1, 12.2 can be connected to a voltage source via bus bars (not shown) (formed, for example, by a silver-containing screen print) and connecting cables (not shown). The thermoplastic laminating films 4.1, 4.2 comprise in each case a thermoplastic film made of PVB with a thickness of 0.38 mm.

Figure 1C:
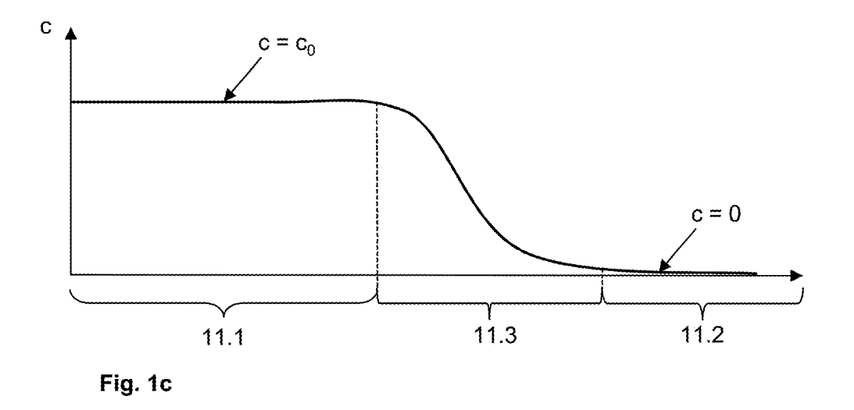

The multilayer film 6 has a concentration gradient of the active substance 7.2 within the active layer 7. The concentration of the active substance 7.2 decreases from the roof edge D of the composite pane 100 to the engine edge M. In the vicinity of the roof edge D, there is a first concentration region 11.1, in which the concentration of the active substance corresponds to an initial concentration $c_0$. This initial concentration $c_0$ is selected such that the desired maximum change in optical properties occurs in this region. The magnitude of the initial concentration $c_0$ depends on the design of the multilayer film. For example, in the case of PDLC multilayer films, it is a function of the liquid crystal selected. In general, $c_0$ corresponds to the concentration that is used in commercially available multilayer films with constant concentration. After the person skilled in the art has selected the desired system from among the numerous multilayer films described in the prior art, the result is thus a suitable initial concentration $c_0$ in the prior art. A second concentration region 11.2 of the multilayer film 6, in which the concentration of the active substance 7.2 is zero, is situated adjacent the engine edge M. Accordingly, the active layer 7 in this region comprises only the matrix 7.1 and no active substance 7.2 at all. The second concentration region 11.2 extends over the entire central field of vision C of the windshield. A third concentration region 11.3, in which the mean concentration of the active substance 7.2 corresponds to one half the initial concentration and, consequently, $c=0.5*c_0$, is situated between the first concentration region 11.1 and the second concentration region 11.2. Within the third concentration region 11.3, there is a concentration gradient, wherein the concentration of the active substance 7.2 decreases with increasing distance from the roof edge D. FIG. 1c depicts this concentration profile in the form of a diagram. Alternatively, the first concentration region 11.1 and the second concentration region 11.2 can be provided even without a third concentration region 11.3 and can be directly adjacent one another. The concentration regions 11.1, 11.3, in which the concentration of the active substance 7.2 is greater than zero, are used as an electrically controllable sun visor. The height of the sun visor is, for example, 21 cm.

In the regions of the functional element 5, in which there is no active substance 7.2 in the active layer 7, no change in the optical properties occurs when a voltage is applied. Consequently, it is not necessary to provide bus bars for electrical contacting in this region. However, the bus bars provided for contacting the regions with active substance 7.2 can protrude into areas without active substance 7.2. Optionally, the bus bars can also be installed along the entire side edges S of the composite pane, regardless of the concentration of the active substance 7.2 in these regions.

The composite pane 100 according to the invention with a multilayer film 6 represents an advantageous further development of the prior art, since the multilayer film 6 can also be provided over a large area in the field of vision of composite panes. This eliminates a visually distracting edge between pane regions without a multilayer film and pane regions with a multilayer film.

Figure 2:
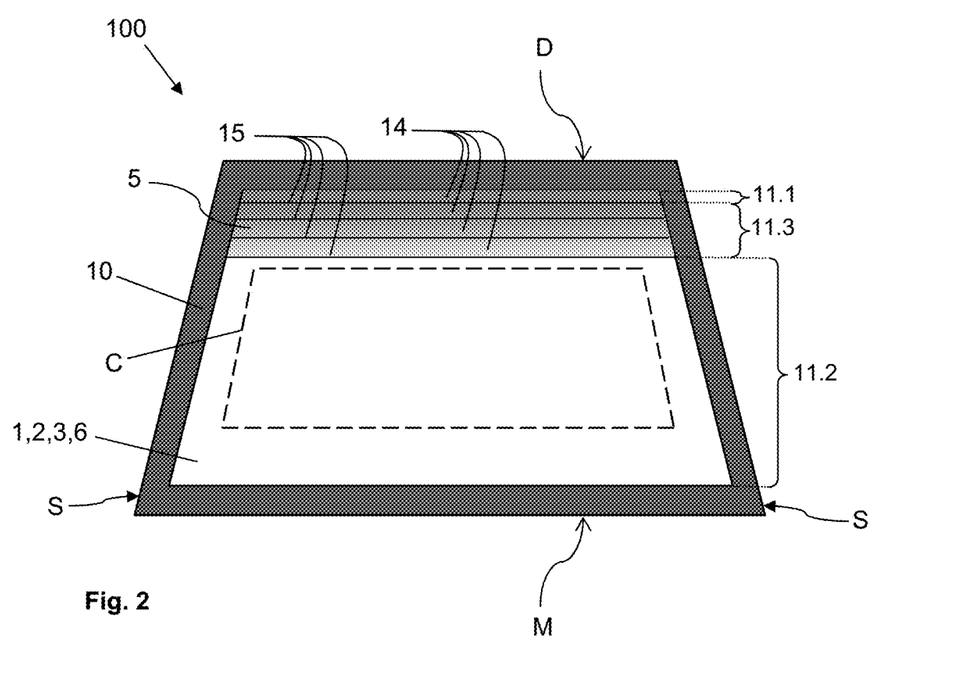

FIG. 2 depicts another embodiment of a composite pane according to the invention with a multilayer film. The composite pane is implemented as a windshield and essentially corresponds to the embodiment described in FIGS. 1a, 1b, and 1c. In contrast, the functional element 5 is divided into multiple segments 14, which can be electrically controlled independently of one another. Such segments can, for example, be useful in the concentration regions 11 of the functional element 5, in which the concentration of the active substance 7.2 is greater than zero (c>0). The PDLC functional element 5 is divided by horizontal separating lines 15 into six strip-like segments 14. The separating lines 15, which provide electrical isolation of the segments 14 from one another, have, for example, a width of 40 μm to 120 μm and mutual spacing of 3.5 cm. They are introduced into the prefabricated multilayer film 6 by laser. Between adjacent separating lines 15, bus bars (not shown) are installed in the region of the opaque masking print 10. The bus bars of the individual segments 14 have in each case a separate electrical connection. Thus, the segments 14 are switchable independently of one another. The thinner the separating lines 15, the less conspicuous they are. Even thinner separating lines 15 can be realized by etching.

The embodiment of FIG. 2 has, as already described relative to FIG. 1a, 1b, 1c, a plurality of concentration regions 11.1, 11.2, 11.3. In terms of their height, the concentration regions 11 of FIG. 2 can be designed independently of the segments 14. A concentration region 11 can comprise one or more segments 14. In the interest of a visually appealing design, in windshields with a sun visor, the transition between two concentration regions 11 is provided, for example, at a separating line 15.

The height of the darkened functional element 5 can be adjusted by the segmentation. Thus, depending on the position of the sun, the driver can darken the entire sun visor or even only a part thereof. Thus, for example, the upper half of the sun visor, closer to the roof edge, can be darkened and the lower half transparent.

In a particularly convenient embodiment, the functional element 5 is controlled by a capacitive switching surface arranged in the region of the functional element, wherein the driver determines the darkening region by the location at which he touches the pane.

Figure 3A:
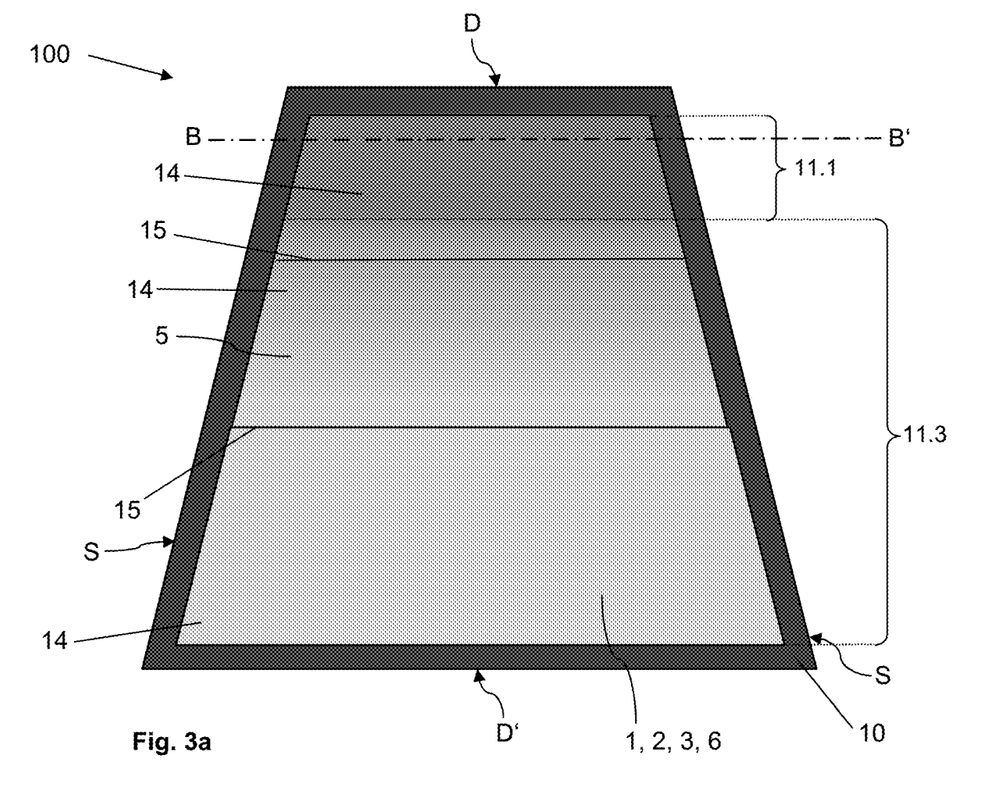
Figure 3B:
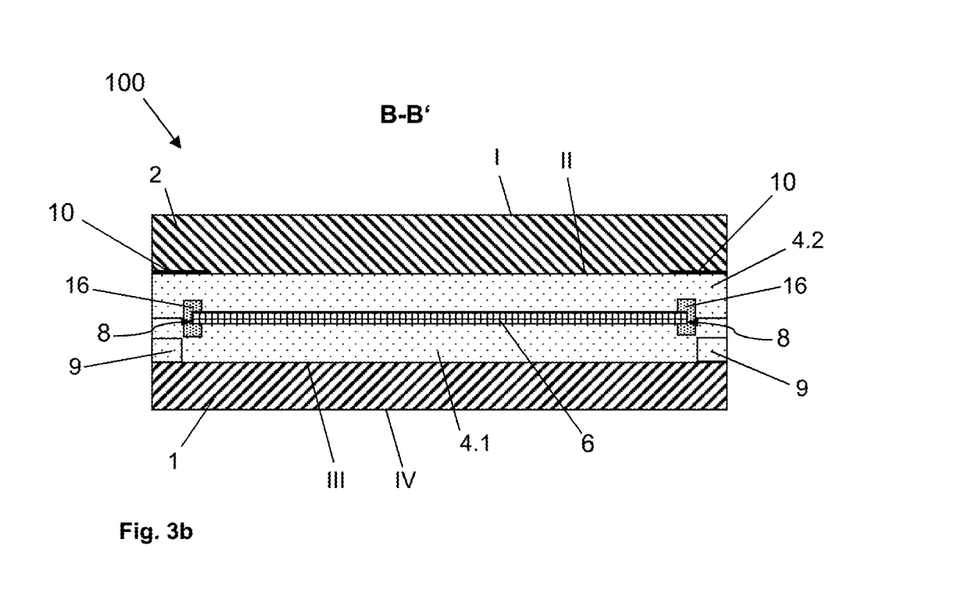

FIGS. 3a and 3b depict another embodiment of a composite pane 100 according to the invention, which is formed as a roof panel of a motor vehicle. The roof panel as well as the multilayer film 6 of the roof panel correspond in their basic structure to the composite pane 100 described in FIG. 2. Differences are discussed in the following. FIG. 3a depicts a plan view of the composite pane 100 as a roof panel of a motor vehicle. The roof panel has a roof edge D, which points toward the windshield in the installed position of the roof panel in a motor vehicle, whereas a rear roof edge D' in the vicinity is oriented toward the rear window. Between the roof edge D and the rear roof edge D', the side edges S extend above the vehicle doors. FIG. 3b depicts a cross-section of the roof panel of FIG. 3a along the section line BB'. The roof panel comprises an inner pane 1, an outer pane 2, a first thermoplastic laminating film 4.1, a second thermoplastic laminating film 4.2, and a multilayer film 6 as a functional element 5. The inner pane 1 and the outer pane 2 are curved congruently with one another. The outer pane of the glazing is oriented toward the vehicle's surroundings, whereas the inner pane of the composite pane points toward the vehicle interior. The outer pane 2 is made of clear soda lime glass with a thickness of 2.1 mm. The inner pane 1 is made of soda lime glass with a thickness of 1.6 mm and is tinted gray. The tinted inner glass contributes to the appealing appearance of the pane, even for the vehicle occupants when looking through the roof panel. The panes 1, 2 are joined via the thermoplastic intermediate layer 3 with the multilayer film 6 inserted therein. The thermoplastic intermediate layer 3 comprises the first thermoplastic laminating film 4.1 and the second thermoplastic laminating film 4.2. The functional element 5, here, in the form of a multilayer film 6, is likewise bonded onto the panes 1, 2 via the thermoplastic laminating films 4.1, 4.2. Along the circumferential edge 8 of the functional element 5, an edge seal 16 that surrounds the circumferential edge 8 is provided. The edge seal 16 can, for example, be glued around the edge 8 in the form of an adhesive tape. In addition, barrier films can also be provided as an edge seal, which barrier films are, for this purpose, placed directly on opposite surfaces of the functional element 5 and positioned essentially congruent with one another. The barrier films overlap the functional element and also protrude beyond the functional element in order to achieve good sealing of the edge 8. The barrier films are substantially plasticizer-free and are made, for example, from PET. By means of the edge seal 16, diffusion of the plasticizer out of the thermoplastic intermediate layer 3 into the functional element 5 and resultant degradation of the functional element 5 are avoided. In this embodiment, a thermoplastic frame film 9 is arranged in sections between the first thermoplastic laminating film 4.1 and the inner pane 1. The thermoplastic frame film 9 is made, for example, from the same material as the thermoplastic laminating films 4.1, 4.2. The thermoplastic frame film 9 has a cutout into which the functional element 5 is inserted with a precise fit with the edge seal 16 and the thermoplastic laminating films 4.1, 4.2, i.e., flush on all sides. The thermoplastic frame film 9 forms a sort of passepartout for the functional element 5. By means of the thermoplastic frame film 9, the differences in thickness caused by the material thickness of the functional element 5 can be compensated. The thermoplastic frame film 9 is optionally used depending on the differences in thickness between regions with a functional element 5 and without a functional element 5. In particular, the thermoplastic frame film 9 is used only in regions that are outside the through-vision region of the composite pane 100 in the region of the opaque masking print 10. In this way, the edge, optically visible in through-vision, between the functional element 5 and the thermoplastic intermediate layer 3 is concealed by the opaque masking print 10. The edge seal 16 can be dispensed with in regions of the multilayer film 6 in which the concentration of the active substance 7.2 is zero. The composition of the multilayer film 6 essentially corresponds to that described in FIG. 1a-1c. In contrast, according to FIG. 3a, there is only a first concentration region 11.1 with an initial concentration $c_0$ of the active substance 7.2 and a third concentration region 11.3 with a concentration of $c<c_0$. In the case of roof panels of motor vehicles, solar protection is desirable in the entire panel region, with greater darkening possibly useful in the front region in order to ensure unrestricted vision for the driver and to avoid glare from sunlight. The functional element 5 can be variably switched in the form of independent segments 14. It is to be expected that often, depending on the position of the sun, only the first segment 14 adjacent the roof edge D is switched to non-transparent. To ensure a visually appealing appearance even in this state, the transition between the first concentration region 11.1 and the third concentration region 11.3 is arranged within this first segment 14. Thus, there is a visually appealing transition between the non-transparently switched first segment and the remaining segments in the transparent state.

LIST OF REFERENCE CHARACTERS 1 inner pane
2 outer pane
3 thermoplastic intermediate layer
4 thermoplastic laminating films
4.1 first thermoplastic laminating film
4.2 second thermoplastic laminating film
5 functional element having electrically controllable optical properties
6 multilayer film
7 active layer of the functional element 5
7.1 matrix of the active layer 7
7.2 active substance of the active layer 7
8 circumferential edge of the functional element 5
9 thermoplastic frame film
10 opaque masking print
11 concentration regions of the active substance 7.1
11.1 first concentration region with initial concentration $c_0$ of the active substance 7.1
11.2 second concentration region without active substance 7.1 (concentration $c=0$)
11.3 third concentration region with lower concentration $c<c_0$ of the active substance 7.1
12 surface electrodes of the functional element 5
12.1 first surface electrode
12.2 second surface electrode
13 carrier films
13.1 first carrier film
13.2 second carrier film
14 segments
15 separating line
16 edge seal
100 composite pane
AA', BB' section lines
Z enlarged region
C field of vision
M engine edge
D roof edge
D' rear roof edge
S side edge

The invention claimed is:

1. A composite pane comprising a functional element having electrically controllable optical properties, comprising:
    an inner pane comprising an inner side and an outer side and an outer pane comprising an inner side and an outer side,
    a thermoplastic intermediate layer, which joins the inner side of the inner pane to the inner side of the outer pane,
    a functional element embedded in the thermoplastic intermediate layer and having electrically controllable optical properties at least comprising a multilayer film containing, arranged surface-to-surface one above the other in this sequence,
    a first carrier film
    a first surface electrode
    an active layer
    a second surface electrode
    a second carrier film,
wherein the active layer comprises a matrix and an active substance, and a concentration of the active substance varies over the surface of the functional element.

2. The composite pane comprising a functional element according to claim 1, wherein the active layer comprises a plurality of concentration regions, which differ in the concentration of the active substance.

3. The composite pane comprising a functional element according to claim 2, wherein the active layer has at least a first concentration region with an initial concentration $c_0$ of the active substance and has a second concentration region, in which the concentration of the active substance is zero.

4. The composite pane comprising a functional element according to claim 3, wherein a third concentration region is arranged between the first concentration region and the second concentration region, in which third concentration region the concentration of the active substance is between the concentration in the first concentration region and the concentration in the second concentration region.

5. The composite pane comprising a functional element according to claim 1, wherein the functional element is a PDLC element, the active layer is a PDLC layer, the matrix is a polymeric matrix, and the active substance is liquid crystals, which are dispersed in the form of liquid crystal droplets in the polymeric matrix.

6. The composite pane comprising a functional element according to claim 5, wherein the concentration of the active substance is varied by the number of liquid crystal drops.

7. The composite pane comprising a functional element according to claim 1, wherein a concentration gradient of the active substance exists from one pane edge of the composite pane to an opposite pane edge of the composite pane.

8. The composite pane comprising a functional element according to claim 1, wherein the composite pane is a windshield of a motor vehicle comprising an engine edge, a roof edge, and two side edges; and a first concentration region with an initial concentration $c_0$ of the active substance is arranged adjacent the roof edge; and a second concentration region, in which a concentration of the active substance is zero, is arranged adjacent the engine edge.

9. The composite pane comprising a functional element according to claim 1, wherein at least one separating line is introduced into at least one surface electrode, and the at least one separating line divides the surface electrode into at least two segments, whose electrically controllable optical properties can be switched independently of one another.

10. The composite pane comprising a functional element according to claim 1, wherein the thermoplastic intermediate layer comprises at least one first thermoplastic laminating film and at least one second thermoplastic laminating film and, optionally, a thermoplastic frame film, wherein the first thermoplastic laminating film joins the functional element to the inner side of the inner pane and the second thermoplastic laminating film joins the functional element to the inner side of the outer pane and the optionally present thermoplastic frame film is arranged between the first thermoplastic laminating film and the second thermoplastic laminating film and surrounds a circumferential edge of the functional element.

11. The composite pane comprising a functional element according to claim 10, wherein at least the region of the first thermoplastic laminating film and/or the second thermoplastic laminating film, which overlaps a first concentration region of the functional element, is tinted or colored.

12. A method for producing a composite pane comprising a functional element according to claim 1, the method comprising:
   a) providing a functional element having electrically controllable optical properties, whose active layer comprises a matrix and an active substance, wherein the concentration of the active substance varies over the surface of the functional element,
   b) placed in this sequence on an inner pane or an outer pane are at least one first thermoplastic laminating film, providing the functional element, and a second thermoplastic laminating film; and completing the layer stack with an inner pane or an outer pane,
   c) joining the inner pane and the outer pane by lamination, wherein a thermoplastic intermediate layer with an embedded functional element is formed from the first thermoplastic laminating film and the second thermoplastic laminating film.

13. The method according to claim 12, wherein before step a), the method further comprises
   a1) providing a first carrier film having a first surface electrode,
   a2) at least in one section, applying a solution comprising a matrix substance for forming a matrix and an active substance on the first surface electrode, wherein a ratio of active substance to matrix substance is selected such that, in at least one section of the first surface electrode, a first concentration region with an initial concentration $c_0$ of the active substance is created,
   a3) at least in one other section, applying a solution comprising a matrix substance for forming a matrix and an active substance on the first surface electrode, wherein the ratio of active substance to matrix substance is selected such that, in at least one section of the first surface electrode, a second concentration region with a concentration $c<c_0$ of the active substance is created,
   a4) covering the arrangement with a second carrier film with a second surface electrode, wherein the second surface electrode is oriented in the direction of the active substance,
   a5) joining the layer stack to form a multilayer film as a functional element, and the active layer is formed from the matrix and the active substance.

14. A method comprising utilizing a composite pane according to claim 1 as a windshield of a vehicle and the electrically controllable functional element as a sun visor.

* * * * *